Oct. 7, 1969   J. F. NELSON   3,470,893
FLUID DISTRIBUTION UNIT
Filed March 4, 1968
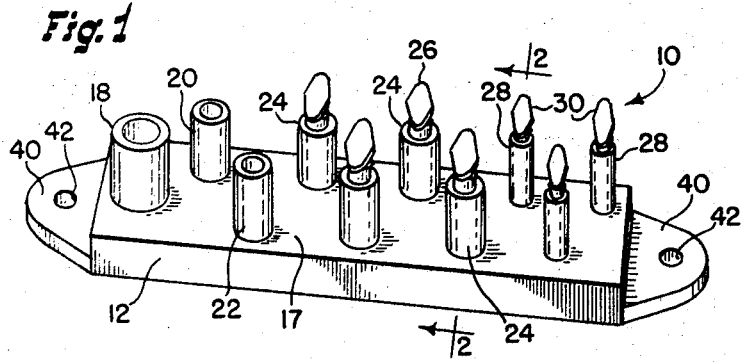
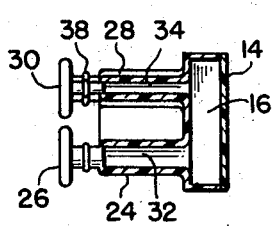
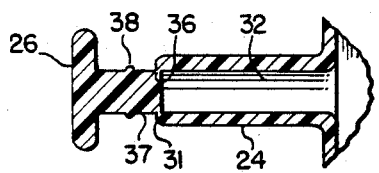
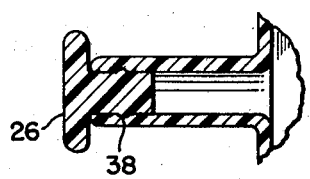
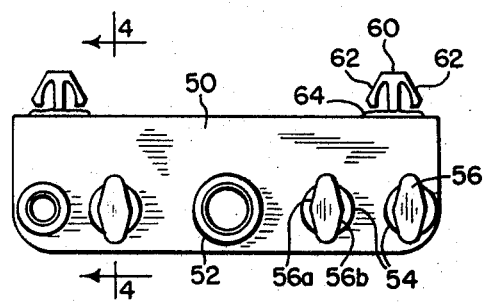
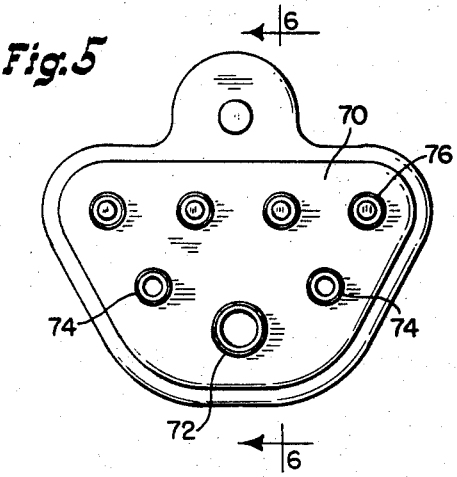
INVENTOR.
John F. Nelson
BY Barry Clark
Robert W. Beatt
His Att'ys

United States Patent Office 3,470,893
Patented Oct. 7, 1969

3,470,893
FLUID DISTRIBUTION UNIT
John F. Nelson, Des Plaines, Ill., assignor to Illinois Tool Works Inc., Chicago, Ill., a corporation of Delaware
Filed Mar. 4, 1968, Ser. No. 710,096
Int. Cl. F16k 13/04, 17/14, 17/40
U.S. Cl. 137—68
10 Claims

ABSTRACT OF THE DISCLOSURE

Fluid distribution unit made of plastic has closed chamber and a plurality of integral nozzles connected thereto, some of which have frangible closures formed therewith which may be broken off when desired. The unit finds particular utility when used as a vacuum junction box in an automobile wherein a tube may be connected to one nozzle of the unit from a source of vacuum and a plurality of auxiliary vacuum using accessories can be connected to the remaining nozzles. By providing a frangible closure on certain of the nozzles, it is possible to use the same junction box on a great number of automobile models regardless of the vacuum requirements of any particular one since the closures can be broken off during assembly to accommodate additional vacuum accessories. The closures are formed with a dimension larger than the nozzle diameter in order to prevent attachment of a tube to a nozzle without first removing the nozzle closure. The closures can have shanks so shaped that they can be driven into the nozzles to seal them in the event the frangible connection is broken inadvertently.

BACKGROUND OF THE INVENTION

Field of the invention

This invention relates to fluid distribution apparatus, and more particularly, to a distribution unit having incoming and outgoing nozzles and a plurality of normally sealed nozzles which can be unsealed in order to permit additional fluid carrying tubes to be attached to the unit.

Description of the prior art

Devices for distributing fluids from a plurality of points to a single point are common as exemplified by an exhaust manifold on a multiple cylinder engine. Likewise, devices for distributing fluid from a single source to a plurality of end use devices are also common as exemplified by gas ranges where gas is fed from a supply into a manifold and distributed from there through a plurality of tubes controlled by valves to the individual burners. Simpler devices, made out of plastic, exemplified by U.S. Patents 3,092,141 and 3,117,587, have nozzles attached to a housing for receiving air from an aquarium pump unit and distributing it through other nozzles, controlled by valves, to various accessories used in the aquarium. In Patent 3,117,587, it is also contemplated that plug members may be substituted for nozzle members when desired.

Although the prior art devices just described to permit the flow of fluid from an inlet to a plurality of outlets to be selectively controlled, they are all somewhat complicated in that they are made up of many parts and either require the use of valves to control the flow or require that separate closure members be substituted for the nozzle members.

Although as just noted, devices have been developed for the control of the flow of air in devices such as aquariums, no relatively simple and economical device has been developed for use in the engine compartments of automobiles to distribute vacuum from the intake manifold to the many devices which utilize it. Without the use of a junction box, the engine compartments of automobiles can become a maze of rubber or plastic tubes and Y-shaped fittings for distributing fluid in one tube to two others and perhaps from each of those tubes to two additional tubes. Not only does such a plurality of individual fittings and pieces of tubing make the engine compartment look messy, but it also introduces losses in the amount of vacuum available due to the additional length of tubing involved. Furthermore, the use of several pieces of tubing necessitates the need for extra fastening elements to hold the tubes out of contact with the hot engine.

SUMMARY

It is an object of this invention to provide a fluid distribution unit which comprises a close body portion and a plurality of integral nozzle portions projecting therefrom, at least one of the nozzle portions being closed at its outer end by an integrally formed closure member frangibly connected thereto.

It is another object of this invention to provide a fluid distribution unit which includes a closure member on at least one nozzle which has at least one dimension greater than the outer diameter of the nozzle so as to block and prevent the attachment of a tube to the nozzle without first breaking away the closure member.

A further object of the invention is to provide a fluid distribution unit which includes integral fastening means for permitting the unit to be fastened to a structure with which it is associated.

An additional object is to provide integral closure members which include head and shank portions and wherein the shank portion is formed so as to be capable of forming a seal with the nozzle opening when driven thereinto in the event that it is desirable to seal a nozzle whose closure has been advertently broken at the frangible connection or to seal a previously opened nozzle opening.

These objects are obtained by the fluid distribution unit of the present invention which preferably takes the form of a vacuum junction box which has a closed body portion molded of plastic material and a plurality of integral nozzle portions projecting from the body portion. At least one of these nozzle portions is normally sealed by means of an integrally formed closure member frangibly connected thereto, the closure member being adapted to be readily broken away from the nozzle portion when desired.

In the preferred embodiments of the invention the fluid distribution unit is used as a vacuum junction box which may be utilized in automobiles having from 2-9 vacuum utilizing devices. The junction box would most likely not be used if the car only had 1 device utilizing vacuum since it would be more economical and practical to connect a single device directly to the intake manifold. Since the junction box would thus not ordinarily be used on an automobile with less than two vacuum operated devices it is preferably formed so that three nozzles are left open. One of the nozzles, which may have a larger internal diameter than the others, is connected to the vacuum source, commonly the manifold, while the other two open nozzles are connected to two vacuum using devices such as for example, the vacuum advance of the distributor and the power brakes. If a customer has not ordered other vacuum operated devices such as retractable head light covers and vacuum operated trunk and vent controls, the remaining nozzles in the junction box are left sealed with their integral closure members. If, on the other hand, additional vacuum operated devices are to be placed in the automobile, then it is possible for the worker on the assembly line or the mechanic who installs the device later on to merely twist or break off the closure member sealing the end of one of the extra nozzles so that the additional vacuum operated device might be attached to it. Furthermore, if by accident a closure should be inadvertently partly broken off or removed by mistake, no harm is done since the closure has an elongated shank which can be driven into the nozzle opening to form a seal.

Although in one embodiment of the invention the closure member consists of a pin having a diameter approximately that of the nozzle opening, it is preferred where there is some chance that a workman will forget to break off the closure before attaching the vacuum hose to it that the end of the closure member be formed so that the hose will not fit over it.

The foregoing and other objects, features and advantages will be apparent from the following more particular description of preferred embodiments thereof, as illustrated in the accompanying drawings.

BRIEF DESCRIPTION OF THE DRAWINGS

FIG. 1 is a perspective view showing the elements of a fluid distribution unit in accordance with the present invention;

FIG. 2 is a sectional side view of the fluid distribution unit shown in FIG. 1 taken along line 2—2 thereof;

FIG. 2A is an enlarged section of a portion of FIG. 2 showing the frangible connection between the closure and nozzle;

FIG. 2B is an enlarged section similar to FIG. 2A showing how the closure may seal the nozzle after the frangible connection is broken;

FIG. 3 is a top plan view of a modified form of fluid distribution unit;

FIG. 4 is a side sectional view of the unit shown in FIG. 3 taken along line 4—4;

FIG. 5 is a top plan view of another modified form of the invention; and

FIG. 6 is a right side view of the modified fluid distribution unit shown in FIG. 5.

DESCRIPTION OF THE PREFERRED EMBODIMENTS

In FIG. 1, the invention can be seen as embodied in a vacuum junction box indicated generally at 10. The junction box comprises a body portion 12 having a bottom or cover portion 14 fastened to it so as to form a hermetic seal such as by the use of adhesives, solvents, or ultrasonic welding to form a closed compartment 16. Formed integrally with the top surface 17 of the junction box are a plurality of nozzle members 18, 20, 22, 24 and 28. Nozzle 18 may be made larger than the other nozzles and serves as an inlet nozzle which is connected by means such as a rubber hose or tube (not shown) to a source of vacuum such as the intake manifold of an automobile engine. Nozzles 20 and 22 each have their ends open and are adapted to receive a length of tubing (not shown) attached to two devices which utilize vacuum such as the power brakes and the vacuum advance portion of the distributor. The remainder of the nozzles 24 and 28 have their end openings 32 and 34 sealed by integral closure members 26, 30 respectively until such time as it is necessary to provide vacuum to an additional device on the car such as a vacuum operated vent control or vacuum operated trunk lock. The nozzles 28 are smaller than the nozzles 24 to accommodate the smaller tubing attached to certain accessories. In order to enable vacuum tubing to be easily slipped onto the nozzles, the end of the nozzles are preferably tapered as at 31 in FIG. 2A.

Since the closure portions, such as cap 26 in FIG. 2A, are integrally attached to the nozzles only by a small thickness of material 36, the caps 26 may be easily broken away from the nozzles by twisting them in either a clockwise or counterclockwise direction. This operation may be performed quite easily by a worker on an automotive assembly line with a pliers. Since each car passing down an assembly line may have different vacuum operated accessories on it than the car either preceding it or following it, it is preferable that the caps 26, 30 not be removed until a particular accessory must be connected to the vacuum supply. By providing a large number of capped nozzles such as the seven shown in FIG. 1 it is possible for the junction box to handle the vacuum requirements for various models of automobiles having anywhere from two to nine different vacuum utilizing devices.

If one of the caps 26, 30 should have its frangible connection to the nozzle 24, 28 fractured inadvertently such as by hitting something against the cap or removing the cap by mistake, it is possible to reseal the nozzle with the cap to prevent loss of vacuum. The manner in which the cap 26 may be used to reseal the nozzle 24 is readily evident in FIGS. 2A and 2B wherein it can be seen that once the frangible connection 36 is broken, the shank 37 may be driven inwardly into opening 32 in nozzle 24. By providing a portion of increased diameter 38 on the shank 37 it is possible to get a positive seal which will not only prevent the loss of vacuum but will retain the cap 26 in tight locking relationship to the nozzle. FIG. 2B is illustrative of the deformation of increased diameter portion 38 which takes place when the cap is driven into the nozzle.

To provide a means to fasten the vacuum junction box to the fire wall or inside fender of an automobile, extension portions 40 may be formed on the ends of the body portion 12. Holes 42 in the portions 40 are adapted to receive fasteners for holding the box to the automobile.

The modified junction box 50 shown in FIGS. 3 and 4 is generally similar to the embodiment of FIG. 1 in that an inlet nozzle 52 is provided for receiving a vacuum hose from a source so as to place the chamber 53 in communication with the vacuum source. A plurality of nozzles 54 having caps 56 are provided for distributing vacuum to a desired number of accessories when vacuum hoses are attached to nozzles 54 after caps 56 are removed. Although generally a vacuum hose will remain attached indefinitely when slightly stretched to slip over a device shaped like nozzle 24 in FIG. 2, it is sometimes desirable to provide an even more positive retention and this may be accomplished by forming the nozzle end with a barb-like entering end 58 as shown in FIG. 4. It should be noted that the caps 56 in FIG. 4 and the caps 26, 30 in FIG. 2 have a dimension in at least one direction which exceeds the diameter of the nozzle tip. This particular configuration not only provides a better gripping surface when it is desired to break off a cap from a nozzle but it prevents a workman from being able to accidentally place a vacuum hose over the nozzle without first removing the cap. The opposite edges 56a, 56b of the caps 56 are preferably parallel to each other as seen in FIG. 3. The parallel relationship of the edges makes them especially easy to grip with a tool having parallel jaws such as a pliers. Integral fastener means 60 are formed on the junction box 50 so as to eliminate the requirement for separate fasteners. Spring arms 62 on fastener 60 are adapted to have their ends moved toward each other as they pass through a hole in a mounting surface (not shown). After passing through the surface they spring outwardly to prevent the junction box from being removed. If it is desired to provide a positive seal between the junction box and the hole in the fastening plate, a layer of sealant 64 may be applied to the junction box. An example of a suitable sealer would be vinyl plastisol.

FIGS. 5 and 6 show another modified junction box 70 which is similar to those previously discussed in that it has an inlet nozzle 72 and distribution nozzles 74 and 76. Certain of the distribution nozzles, namely, nozzles 76, are sealed with integral pins 78 which are attached to the nozzles 76 as the cap shanks 37 are attached to the nozzles 24 in FIG. 2A. Although the pins 78 offer certain of the advantages of the caps 26, 30 and 56 in that they can be broken away to open the nozzles, they would not eliminate the possibility of attaching a hose over the end 80 of a sealed nozzle. Furthermore, although they could be used to reseal a nozzle if their diameter were greater than the diameter of the nozzle opening, they would not function as well in this capacity as the caps since they would be more difficult to remove once they were driven in. The back plate 82 of the junction box 70 may be attached to a mounting surface by a fastener 84 which expands when pin 86 is driven into it.

While the invention has particularly been shown and described with reference to preferred embodiments thereof, it will be understood by those skilled in the art that variations in form and details may be made therein without departing from the spirit and scope of the invention.

I claim:

1. A fluid distribution unit comprising a closed, substantially hollow, molded plastic body portion and a plurality of integral nozzle portions projecting from a predetermined side of said body portion, a first one of said nozzle portions including an end portion adapted to receive a tube connected to a supply member, a second one of said nozzle portions including an end portion adapted to receive a tube connected to a distribution member, and at least a third one of said plurality of nozzle portions being closed at its outer end by an integrally formed closure member frangibly connected thereto at the inner margin of said nozzle portion, said closure member being adapted to be broken away from the nozzle portion to which it is connected whereby to expose an open outer end portion thereof to the hollow plastic body portion by the integral hollow nozzle to which an additional fluid carrying tube may be connected.

2. The fluid distribution unit of claim 1 wherein said closure member has an elongated shank portion end adapted to be received within the opening formed in the outer end of said third nozzle portion for resealing said nozzle after the frangible connection is broken, said shank portion having an increased diameter portion spaced from its end which is adapted to enter the nozzle opening for contacting the walls of the nozzle opening and effecting a seal when it is moved in an axial direction into the nozzle opening.

3. The fluid distribution unit of claim 1 wherein said closure member includes a cap portion spaced outwardly from the nozzle opening, said cap portion having a dimension in a direction transverse to the axis of the nozzle opening which is larger than the outside diameter of the nozzle.

4. The fluid distribution unit of claim 1 wherein fastening means are formed integral with the unit, said fastening means being adapted to be resiliently compressed when moved in one direction through an opening in a support but resisitng movement in the opposite direction.

5. A vacuum junction box comprising a substantially hollow molded plastic body portion, at least two open ended nozzle portions integrally formed with said body portion and extending outwardly therefrom, one of said open ended nozzle portions being adapted to receive a tube connected to a vacuum supply, and each of the remainder of said at least two open ended nozzle portions being adapted to receive a tube connected to a vacuum receiving device, a cover portion sealed to said body portion and cooperating with said body portion to form an enclosed chamber, at least one additional nozzle portion integrally formed with said body portion and extending outwardly therefrom in the same direction as said open ended nozzle portions, and a closure member integrally molded with and attached to the inner margin of the end of said at least one additional nozzle portion by a frangible connection portion, said closure member having a portion which may be engaged by a means for exerting a force on said closure member for moving said closure member relative to said at least one additional nozzle portion to break said frangible connection and open the end of said nozzle portion, said at least one additional nozzle portion being adapted, when opened, to receive a tube connected to a vacuum receiving device.

6. The vacuum junction box of claim 5 wherein said closure member comprises a shank portion attached to said at least one additional nozzle portion, and an enlarged cap portion on the outer end of said shank said cap portion having a dimension in a direction transverse to the axis of the nozzle which is greater than the outside diameter of the nozzle, said greater dimension of the cap portion serving to prevent a vacuum hose from being slipped over the nozzle and attached to it without having first removed the closure member.

7. The vacuum junction box of claim 6 wherein at least a portion of said shank located between said nozzle portion and said enlarged cap portion has an enlarged diameter greater than the diameter of the shank at the nozzle portion, said shank being adapted, after said frangible connection is broken, to be driven into said nozzle opening, said shank portion of greater diameter cooperating with the interior surface of the nozzle opening to seal the opening and retain the closure member.

8. The vacuum junction box of claim 6 wherein said cap portion has at least two opposite edges which are substantially parallel.

9. The vacuum junction box of claim 7 wherein said enlarged diameter portion of said shank comprises an annular ring of material formed integrally with said shank.

10. The vacuum junction box of claim 5 wherein resilient fastening means adapted to be snapped into a mounting hole are integrally formed on said junction box.

References Cited

UNITED STATES PATENTS

| | | | |
|---|---|---|---|
| 1,821,533 | 9/1931 | Volk | 220—27 XR |
| 1,931,527 | 10/1933 | Burkett et al. | 24—214 XR |
| 2,148,419 | 2/1939 | Parker | 285—150 XR |
| 2,360,647 | 10/1944 | Churchill | 24 |
| 2,392,195 | 1/1946 | Shonnard | 220—27 |
| 2,508,231 | 5/1950 | De Frees. | |
| 2,750,068 | 6/1956 | Platt | 220—27 |
| 3,092,141 | 6/1963 | Stark. | |
| 3,117,587 | 1/1964 | Willinger. | |
| 3,187,966 | 6/1965 | Klygis. | |
| 3,282,457 | 11/1966 | Sirois | 220—27 |

WILLIAM F. O'DEA, Primary Examiner

R. G. NILSON, Assistant Examiner

U.S. Cl. X.R.

137—351, 602, 608, 797; 285—3, 150